United States Patent
Szigeti et al.

(10) Patent No.: US 11,824,866 B2
(45) Date of Patent: Nov. 21, 2023

(54) PERIPHERAL LANDSCAPE AND CONTEXT MONITORING FOR USER-IDENTIFY VERIFICATION

(71) Applicant: Cisco Technology, Inc., San Jose, CA (US)

(72) Inventors: Thomas Szigeti, Vancouver (CA); David John Zacks, Vancouver (CA); Frank Michaud, Pully (CH); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 17/168,353

(22) Filed: Feb. 5, 2021

(65) Prior Publication Data

US 2022/0255942 A1  Aug. 11, 2022

(51) Int. Cl.
*H04L 9/40* (2022.01)

(52) U.S. Cl.
CPC ........ *H04L 63/102* (2013.01); *H04L 63/0853* (2013.01); *H04L 63/0884* (2013.01); *H04L 63/107* (2013.01); *H04L 2463/082* (2013.01); *H04L 2463/121* (2013.01)

(58) Field of Classification Search
CPC ..... H04W 12/06; H04W 12/08; H04W 12/63; H04L 63/107; H04L 63/102; H04L 63/0884; H04L 63/0853
See application file for complete search history.

(56) References Cited

U.S. PATENT DOCUMENTS

| | | | | |
|---|---|---|---|---|
| 8,321,913 | B2* | 11/2012 | Turnbull | H04W 12/06 726/4 |
| 8,495,700 | B2* | 7/2013 | Shahbazi | H04L 63/105 455/410 |
| 9,172,546 | B2* | 10/2015 | Friedl | H04L 63/08 |
| 10,149,136 | B1* | 12/2018 | Sathya | H04L 9/0816 |
| 10,200,364 | B1* | 2/2019 | Ketharaju | H04L 63/0853 |
| 10,333,980 | B2* | 6/2019 | Ting | H04L 63/10 |
| 10,423,493 | B1* | 9/2019 | Vig | G06F 11/3055 |
| 10,805,278 | B2* | 10/2020 | Griffin | H04L 63/0492 |
| 11,057,777 | B2* | 7/2021 | Wei | H04W 12/37 |
| 11,080,336 | B2* | 8/2021 | Van Dusen | G06Q 50/01 |

(Continued)

OTHER PUBLICATIONS

M. Haus, M. Waqas, A. Y. Ding, Y. Li, S. Tarkoma and J. Ott, "Security and Privacy in Device-to-Device (D2D) Communication: A Review," in IEEE Communications Surveys & Tutorials, vol. 19, No. 2, pp. 1054-1079, Secondquarter 2017. (Year: 2017).*

(Continued)

*Primary Examiner* — Kari L Schmidt
(74) *Attorney, Agent, or Firm* — Polsinelli

(57) ABSTRACT

Disclosed are methods, systems, and non-transitory computer-readable media for determining a trust score associated with a user, comprising detecting entities near a user device operated by the user; calculating the trust score for the user based on a policy that incorporates data about the entities near the user device, the trust score being a score that is indicative of a trust worthiness of data received from the user device, wherein trusted entities near the user device result in an increased trust score, and untrusted entities near the user device result in a decreased trust score; and permitting access to a resource when the trust score is above a threshold.

20 Claims, 5 Drawing Sheets

(56) References Cited

U.S. PATENT DOCUMENTS

| | | | |
|---|---|---|---|
| 11,455,641 B1* | 9/2022 | Shahidzadeh | H04L 63/0892 |
| 2008/0307488 A1* | 12/2008 | Hammond, II | H04L 41/0659 |
| | | | 726/1 |
| 2009/0145967 A1* | 6/2009 | Carpenter | G07B 17/00661 |
| | | | 235/385 |
| 2009/0265775 A1* | 10/2009 | Wisely | H04L 63/0492 |
| | | | 380/270 |
| 2009/0307182 A1 | 12/2009 | Eytchison et al. | |
| 2010/0056175 A1* | 3/2010 | Bachmann | H04W 8/08 |
| | | | 455/456.1 |
| 2013/0212486 A1* | 8/2013 | Joshi | H04W 4/02 |
| | | | 715/744 |
| 2014/0379911 A1* | 12/2014 | Fayssal | H04W 12/065 |
| | | | 709/225 |
| 2015/0229650 A1 | 8/2015 | Grigg et al. | |
| 2015/0365427 A1* | 12/2015 | Ben-Shalom | G06F 21/56 |
| | | | 726/23 |
| 2016/0080486 A1* | 3/2016 | Ram | H04L 51/046 |
| | | | 709/205 |
| 2016/0247132 A1* | 8/2016 | Zamer | G06Q 20/4014 |
| 2017/0085565 A1* | 3/2017 | Sheller | G06F 21/305 |
| 2017/0126647 A1* | 5/2017 | Zhang | H04L 63/08 |
| 2017/0359169 A1* | 12/2017 | Benson | H04L 63/0428 |
| 2018/0048630 A1* | 2/2018 | Griffin | H04L 63/105 |
| 2018/0069867 A1 | 3/2018 | Grajek et al. | |
| 2018/0077569 A1* | 3/2018 | Chao | H04L 67/104 |
| 2018/0184236 A1* | 6/2018 | Faraone | H04W 4/027 |
| 2018/0351962 A1* | 12/2018 | Kulkarni | H04W 12/64 |
| 2019/0007894 A1* | 1/2019 | Subramanian | H04W 64/00 |
| 2019/0019363 A1 | 1/2019 | Zellner | |
| 2019/0163973 A1* | 5/2019 | Keohane | G06N 3/084 |
| 2019/0188368 A1* | 6/2019 | Hastings | H04L 63/0492 |
| 2019/0342342 A1* | 11/2019 | Ting | H04W 4/02 |
| 2020/0007539 A1* | 1/2020 | Vishwanath | H04L 63/102 |
| 2020/0084229 A1* | 3/2020 | Areno | G06F 21/71 |
| 2020/0104852 A1* | 4/2020 | Douglas, Jr. | G06Q 30/018 |
| 2021/0409405 A1* | 12/2021 | Salajegheh | H04L 63/0884 |
| 2022/0300538 A1* | 9/2022 | Chrapko | G06F 16/9536 |

OTHER PUBLICATIONS

Khan, Hassan, and Urs Hengartner. "Towards application-centric implicit authentication on smartphones." Proceedings of the 15th Workshop on Mobile Computing Systems and Applications. 2014, pp. 1-6. (Year: 2014).*

Li, Xiaopeng, et al. "T2pair: Secure and usable pairing for heterogeneous iot devices." Proceedings of the 2020 acm sigsac conference on computer and communications security. 2020, pp. 1-6. (Year: 2020).*

Lenzini et al., "Trust-Enhanced Security In Location Adaptive Authentication," Science Direct, Electronic Notes in Theoretical Computer Science, 197, Feb. 2008, pp. 105-119.

\* cited by examiner

PERIPHERAL LANDSCAPE AND CONTEXT MONITORING FOR USER-IDENTIFY VERIFICATION

TECHNICAL FIELD

The present technology pertains to a system that determines a confidence score, herein called a trust score, descriptive of a confidence in an authentication of a user, and more specifically, the present technology pertains to a system that determines the confidence score based in part on a peripheral device landscape and/or content known to a device calculating the confidence score.

BACKGROUND

Users in continuous authentication environments need to have their identity repeatedly affirmed to maintain a reasonable level of certainty that users are who they claim to be. One way to maintain continuously high levels of trust in user is by monitoring certain aspects of their environment, including the presence of peripheral devices connected to or detectable by a user's authentication device in the nearby physical environment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
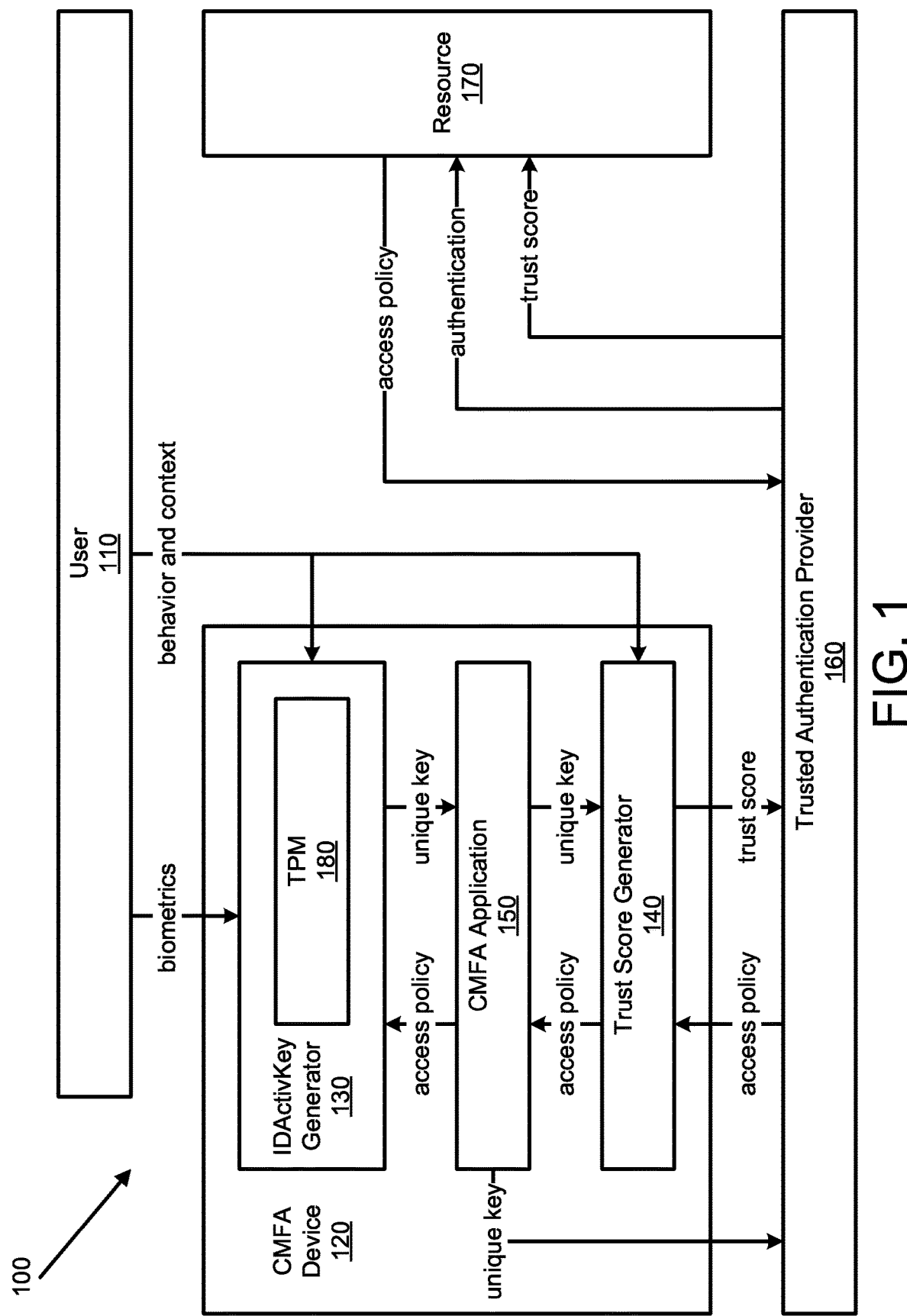
FIG. 1 illustrates an example continuous multi-factor authentication (CMFA) system in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Methods, systems, and non-transitory computer-readable media are provided for determining a trust score associated with a user.

A method can include detecting entities near a user device operated by the user; calculating the trust score for the user based on a policy that incorporates data about the entities near the user device, the trust score being a score that is indicative of a trust worthiness of data received from the user device, wherein trusted entities near the user device result in an increased trust score, and untrusted entities near the user device result in a decreased trust score; and permitting access to a resource when the trust score is above a threshold.

In some embodiments, the method can include, at a time prior to detecting the entities nearby to the user device operated by the user, creating a proximity profile associated with the user, wherein creating the proximity profile comprises collecting snapshots of the entities near the user device or of entities near another device operated by the user; labeling the snapshots with timestamps indicating when the snapshots were collected; identifying patterns associated with a statistically significant number of occurrences in the snapshots; and storing the patterns associated with the statistically significant number of occurrences in the proximity profile, where the patterns stored in the proximity profile are considered trusted entities.

In some embodiments of the method, calculating the trust score can include determining whether the entities near the user device match at least one of the patterns stored in the proximity profile; and when the entities near the user device match at least one of the patterns stored in the proximity profile, increasing the trust score.

In some embodiments, the method can include patterns contextualized by time where at least one of the patterns is of the entities near the user device, or of a lack of the entities near the user device, and is considered trusted during a recorded time interval.

In some embodiments, the method can include patterns contextualized by location, where at least one of the patterns is of the entities near the user device, or of a lack of the entities near the user device, and is considered trusted when the user device is near a particular location.

In some embodiments of the method, calculating the trust score can include evaluating the entities near the user device by a machine learning algorithm which classifies a context of the user device as trusted or untrusted and using an output of the machine learning algorithm to calculate the trust score.

In some embodiments, the method can include trusted entities which are a collection of the entities that are commonly simultaneously detected nearby to the user device.

In some embodiments, the method can include trusted entities which are devices that are explicitly trusted in the policy.

In some embodiments, the method can include devices that are corporate-controlled devices and are corporate access points that collectively reinforce that the user is on a corporate network, wherein examples of the devices include, but are not limited to, routers, IP surveillance cameras, door locks, badge readers, etc.

In some embodiments, the method can include devices that are providing an accepted attestation of trustworthiness.

In some embodiments, the method can include entities that are other user-operated devices, and the entities are considered trusted when the trust scores for their respective users are high, and the entities are considered untrusted when the trust scores for their respective users are low.

In some embodiments, the method can include entities that are trusted when they are associated with a location, and at least one of the entities is a device that is associated with data that is a proxy for an identification of a physical space associated with location, such as a smart vacuum that includes a map of the physical space, a camera viewing the physical space, a radio frequency device that can produce a map of the physical space, etc.

A system can include a storage configured to store instructions and a processor configured to execute the instructions and cause the processor to detect entities near a user device operated by the user; calculate the trust score for the user based on a policy that incorporates data about the entities near the user device, the trust score be a score that is indicative of a trust worthiness of data received from the user device, wherein trusted entities near the user device result in an increased trust score, and untrusted entities near the user device result in a decreased trust score; and permit access to a resource when the trust score is above a threshold.

A non-transitory computer-readable medium can include instructions which, when executed by a processor, cause the processor to determine a trust score associated with a user, the instructions comprising detecting entities near a user device operated by the user; calculating the trust score for the user based on a policy that incorporates data about the entities near the user device, the trust score be a score that is indicative of a trust worthiness of data received from the user device, wherein trusted entities near the user device result in an increased trust score, and untrusted entities near the user device result in a decreased trust score; and permitting access to a resource when the trust score is above a threshold.

DESCRIPTION OF EXAMPLE EMBODIMENTS

The present technology pertains to methods, systems, and non-transitory computer-readable media for determining a trust score associated with a user. Specifically, the present technology pertains to determining a trust score based in part on a peripheral device landscape and/or content known to a device calculating the confidence score.

Multi-factor authentication methods aim to increase confidence that a user is an authorized user. Biometrics, secondary devices, and other factors are often used to increase confidence in a user. By incorporating new factors into the determination of a trust score, confidence in a user can be greater.

One under-leveraged factor for increasing trust involves peripheral devices. Users often access resources in similar settings; consider an employee who primarily logs into a corporate VPN while in the employee's office. These settings can be strongly correlated with specific devices seen by the user's device, such as the office printer, co-workers' computers, and other devices. Further, a user's presence is often accompanied by specific devices, such as a user's smartwatch. This can occur regardless of the actual location of the user.

Leveraging the peripheral device landscape can increase (or decrease) the trust score for a user. Once known or repeated patterns of peripheral devices are learned, their presence can be used to increase trust in a user. Conversely, if the pattern of peripheral devices is anomalous, trust in the user can be decreased.

This disclosure will first discuss an example continuous multi-factor authentication (CMFA) system. Then, the disclosure will discuss example embodiments related to the use of devices in a user's environment to help determine whether the user is who the user claims to be. Finally, the disclosure will discuss an example computing system which can be used to execute the present technology.

FIG. 1 illustrates an example continuous multi-factor authentication (CMFA) system 100 in accordance with some aspects of the present technology. User 120 can gain authorized access to resource 170 by using CMFA device 120.

Resource 170 can be any service, resource, device, or entity which requires authentication of user 110. For example, resource 170 can be a social media service, bank, hospital, motor vehicle department, bar, voting system, Internet of Things (IOT) device, or access device. In some embodiments, resource 170 can be accessed by user 110 through an access device, such as a mobile phone or personal computer. In some embodiments, resource 170 can be accessed by user 110 through an application that is specifically designed for accessing resource 170, or through a more general application which can access multiple services, such as a web browser, or portions of an operating system. In some embodiments, resource 170 can be the same device as CMFA device 120. In some embodiments, resource 170 can be a plurality of resources, such as an access device and a service which receive separate authentications from trusted authentication provider 160.

Resource 170 can authenticate the identity of user 110 through trusted authentication provider 160, which can be in communication with CMFA device 120. Data gathered by CMFA device 120 can be used for authentication of user 110 to resource 170 via trusted authentication provider 160. Trusted authentication provider 160 can receive an identification credential, such as an IDActivKey, from CMFA device 120 via CMFA application 150 that is unique to resource 170 for user 110. Trusted authentication provider 160 can also receive a trust score from CMFA device 120 via trust score generator 140. Upon receiving an IDActivKey and a trust score, trusted authentication provider 160 can use this information in tandem with access requirements received from resource 170 to authenticate user 110 to resource 170.

To generate identification credentials, CMFA Device 120 can be associated with user 110 and can gather biometric, behavioral, and contextual data from user 110. The biometric, behavioral, or contextual data, or some combination thereof, can be used by IDActivKey generator 130 to generate a unique IDActivKey corresponding to resource 170. These biometrics can include, for example, fingerprints, facial detection, retinal scans, voice identification, or gait data, among other biometrics. For each resource 170, a cryptographic seed from a pseudo-arbitrary number generator in trusted platform module (TPM) 180 can be used to select a sampling of the biometric data to be used in an IDActivKey for the application in question. In some embodiments, the IDActivKey may only be derived when CMFA device 120 determines that certain behavioral and contextual requirements indicate compliance with a policy. In some embodiments, there can be a "master" IDActivKey that is used to gain access to trusted authentication provider 160.

In some embodiments, behavioral and contextual data can be used to ensure that the context of user 110 is acceptable as specified by a policy of resource 170. Behavioral and contextual data can be used by trust score generator 140, which can generate a trust score as a measure of confidence in the authentication of user 110, and as a measure of confidence that the authenticated user 110 is still present and behaving acceptably as specified by a policy of resource 170.

In some embodiments, trusted computing implementations, such as TPM 180, can rely on roots of trust. Roots of trust can provide assurances that the root has been implemented in a way that renders it trustworthy. A certificate can identify the manufacturer and evaluated assurance level (EAL) of TPM 180. Such certification can provide a level of confidence in the roots of trust used in TPM 180. Moreover, a certificate from a platform manufacturer may provide assurance that TPM 180 was properly installed on a system that is compliant with specific requirements so the root of trust provided by the platform may be trusted. Some implementations can rely on three roots of trust in a trusted platform, including roots of trust for measurement (RTM), storage (RTS), and reporting (RTR).

Trust score generator 140 can generate a trust score for user 110 using behavioral and contextual data, the surrounding environment, or other sources. For example, location information can be derived from the network that user 110 is using. These data can include information about location, movement, or device behavior. The trust score reflects a confidence level that user 110 complies with a policy specified by resource 170. This includes the confidence that user 110 is the person operating the current session.

Trusted authentication provider 160 can request updated IDActivKeys and trust scores at different intervals depending on the requirements specified by the access policies defined by resource 170. It can send new access policies received from resource 170 during a session to CMFA device 120. Trusted authentication provider 160 can shield private information from resource 170, providing authentication without revealing personal information such as birth dates, social security numbers, or marital status, etc. In some embodiments, trusted authentication provider 160 need only inform resource 170 that access should be granted, while in some embodiments trusted authentication provider 160 can send an IDActivKey to resource 170.

User 110 can be any user including an employee, contractor, client, member of an organization, or private individual, etc. attempting to access a service. User 110 can use an access device to access resource 170 which may or may not be the same device as CMFA device 120. In some embodiments, CMFA device 120 can be used to authenticate an access device.

CMFA device 120 can be hardware, software-only, or combinations thereof. CMFA device 120 can be a mobile device or a personal computer; it may or may not be the same device as access device. In some embodiments, CMFA device 120 can include secure hardware such as TPM 180. In some embodiments, one or more of IDActivKey generator 130, TPM 180, and trust score generator 140 can be located in a physically separate and secure portion of CMFA device 120.

While FIG. 1 only illustrates one application 190, and one resource 170, it should be appreciated that there can be any number of applications 190 or application providers 170. Each resource 170 can have an access policy, and any IDActivKey will be unique to each respective resource 170.

The present technology discloses a means to add new factors to the trust score generated by trust score generator 140 in CMFA device 120. Connected devices to CMFA device 120, as well as other devices in the ambient environment, can give clues as to the identity of user 110. The present technology leverages both kinds of devices to modulate the trust score using a proximity profile. A proximity profile comprising devices near CMFA device 120 can be compiled which can include identities of nearby devices, timestamps of when these devices are detected, and the identification of patterns of connectivity and proximity to these devices. When devices are detected, they can be compared to proximity profiles and used to increase or decrease the trust score depending on the nature of the devices.

Figure 2:
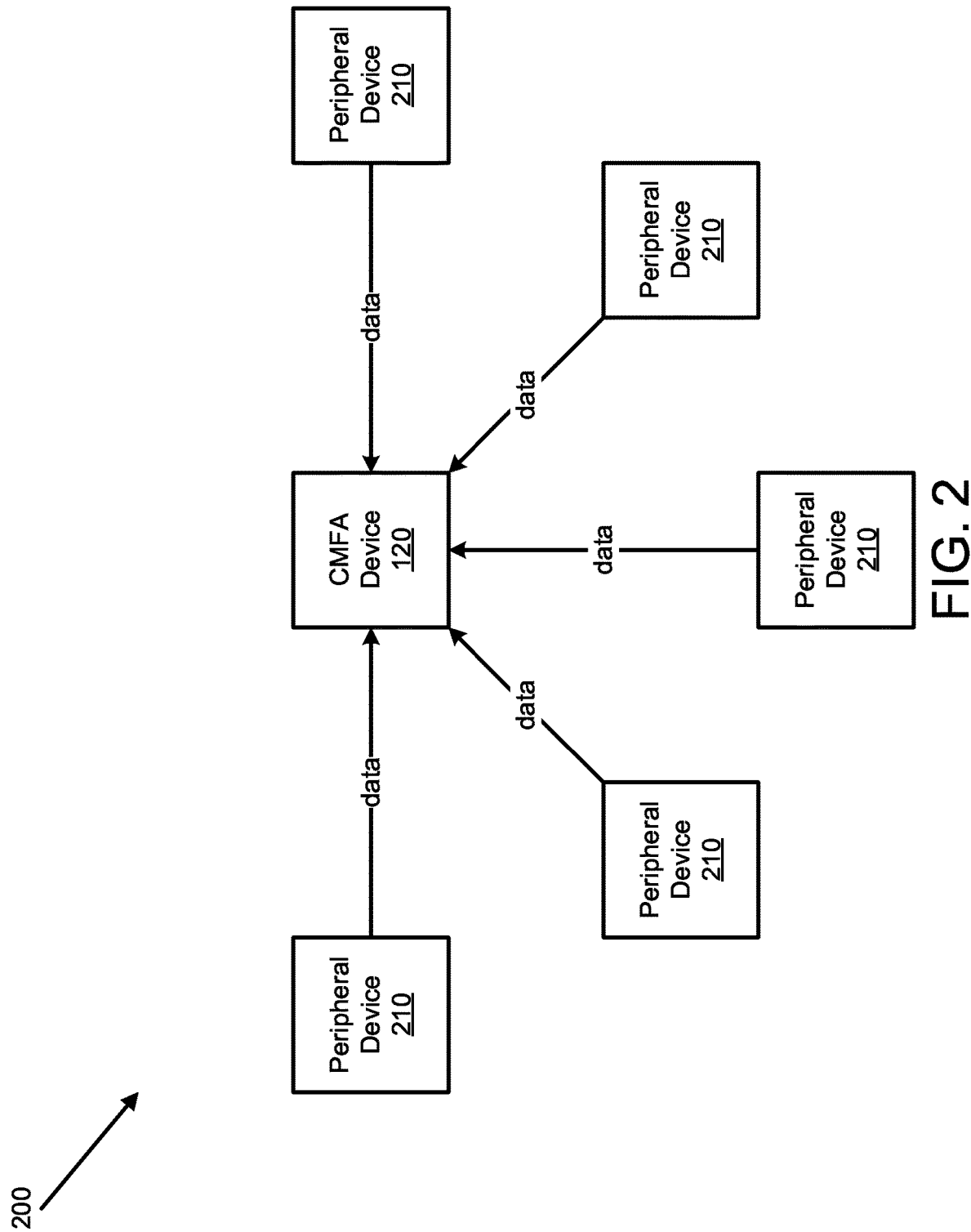
FIG. 2 illustrates an example system in accordance with some aspects of the present technology.

FIG. 2 illustrates an example system 200 in accordance with some aspects of the present technology. CMFA device 120 can receive data from peripheral devices 210. This data can be used as a factor in generating the trust score described in FIG. 1.

Peripheral devices 210 can be devices which are detectable by CMFA device 120 via Bluetooth, near-field communication, infrared, Wi-Fi, or other means. They can be owned or operated by user 110, or owned or operated by a third party, such as a family member, friend, colleague, or enterprise. Peripheral devices 210 can be portable, such as smartwatches, or stationary, such as desktop computers.

Because some peripheral devices 210 can be seen by CMFA device 120, their presence can be used as a factor for generating a trust score for user 110. When peripheral devices 210 are trusted devices, such as other devices owned and operated by user 110 or devices to which CMFA device 120 is connected, they can increase the trust score for user 110 operating CMFA device 120.

The presence of peripheral devices 210 can provide corroborating evidence for the context of user 110, such as being in a given workspace, along with GPS, IP address, and other factors. In other cases, such as when user 110 is in an unexpected location, the presence of peripheral devices 210 can give increased confidence that user 110 is operating CMFA device 120. In some embodiments, peripheral devices 210 can identify a physical space, like a workspace. Such devices can include a smart vacuum that includes a map of a physical space, a camera viewing a physical space, a radio frequency device that can produce a map of the physical space, and others.

Patterns of peripheral device presence or connections can be learned by CMFA device 120. These patterns can be used to modulate trust scores. For instance, CMFA device 120 may usually be connected to all of peripheral devices 210 but, when user 110 takes a bike ride on Sunday afternoons, they are only connected to one of peripheral devices 210, such as a smartwatch. When this first occurs, the trust score can go down, but as the pattern repeats and becomes known, the trust score will eventually not decrease (or decrease less) during the bike rides. In some embodiments, the classification of trust or non-trust can be done by a machine learning algorithm. This classification can be either binary or based on a scale. For instance, user 110 could be given a numerical trust score. If this trust score is above a first threshold, user 110 could have full access privileges; if the trust score is above a second threshold, user 110 could have limited access privileges; and so on. Limited access privileges could include limitations by time, location, or type of resource accessed. Trust classifications can be as granular or as broad as desired based on policies set by trusted authentication provider 160 or resource 170.

CMFA device 120 can determine whether the current pattern of peripheral devices 210 matches a known pattern, and modulate the trust score accordingly. These patterns can be contextualized by time, location, the set of present devices, or by other factors.

In some embodiments, certain peripheral devices 210 can be trusted explicitly by a policy, such as by a policy for accessing resource 170 as illustrated in FIG. 1. For example, peripheral devices can be corporate-controlled devices and corporate access points on a corporate network, and can include routers, IP surveillance cameras, door locks, badge readers, or other devices.

In some embodiments, CMFA device 120 can use information beyond mere presence to influence the generated trust score. For example, certain peripheral devices 210 may be able to identify the environment that user 110 is in, such as a smart vacuum that creates a floor map of the home of user 110. This floor map can be used by CMFA device 120 to further contextualize user 110 and increase the trust score. Peripheral devices 210 can be queried via mDNS or similar probing methods to reveal their names, the subnets on which they reside, and their known MAC addresses, and ultimately to get information like floor maps or other relevant information. When peripheral devices 210 are known or trusted by trusted authentication provider 160, their presence can increase the trust score of user 110. Trusted authentication provider 160 can increase the trust score for user 110 when the trust scores for users of peripheral devices 210 are high, and decrease the trust score for user 110 when the trust scores for users of peripheral devices 210 are low.

Figure 3A:
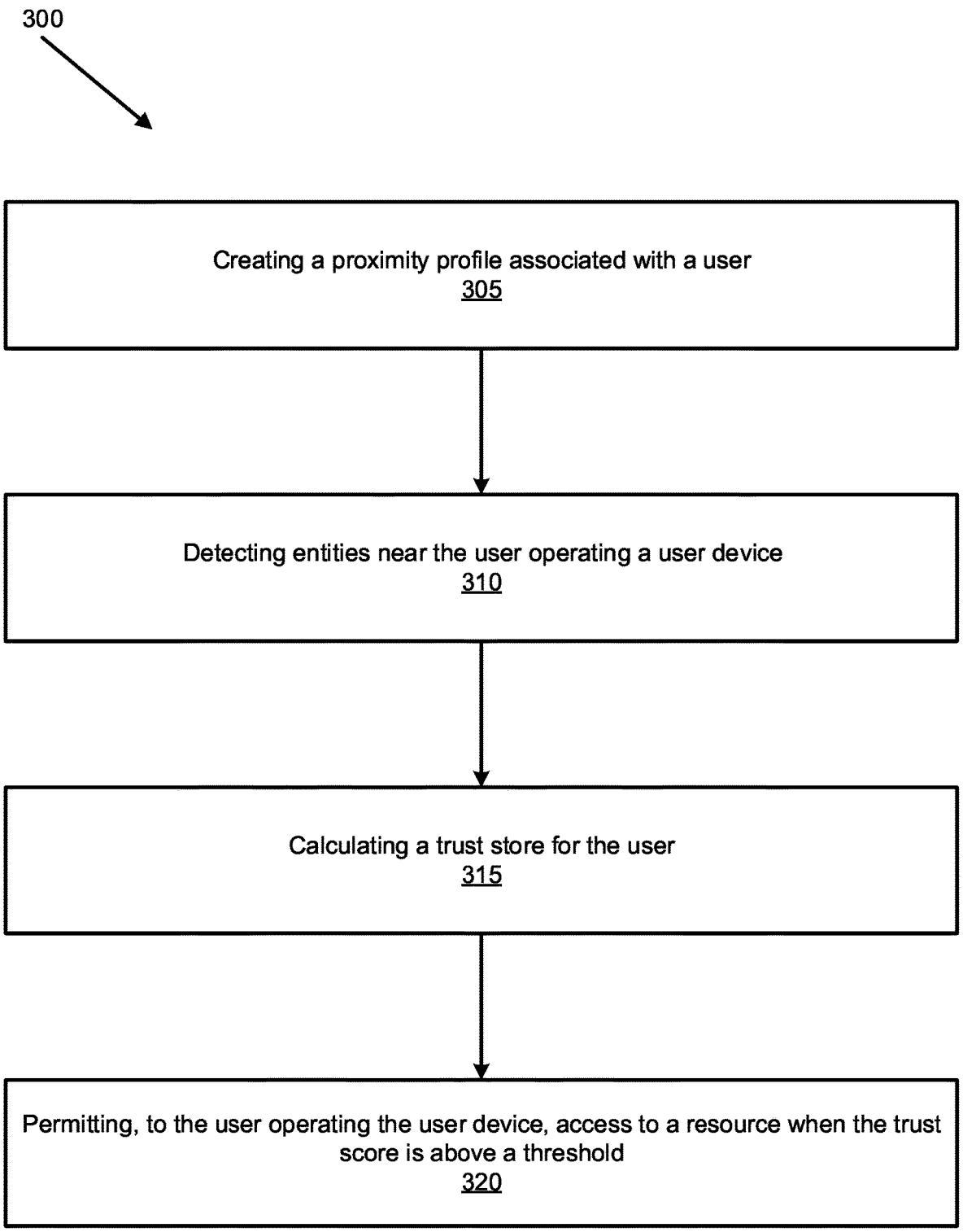
FIGS. 3A and 3B are flowcharts of methods for determining a trust score associated with a user in accordance with some aspects of the present technology.

FIG. 3 illustrates an example method 300 for determining a trust score associated with a user. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes creating a proximity profile associated with a user at block 305. For example, CMFA device 120 illustrated in FIG. 1 can create a proximity profile associated with a user.

In some embodiments of creating a proximity profile at block 305, the method comprises collecting snapshots of the entities near the user device or of entities near another device operated by the user. For example, CMFA device 120 illustrated in FIG. 1 can collect snapshots of the entities near the user device or of entities near another device operated by the user.

Further, the method can include labeling the snapshots with timestamps indicating when the snapshots were collected. For example, CMFA device 120 illustrated in FIG. 1 can label the snapshots with timestamps indicate when the snapshots were collected.

Further, the method can include identifying patterns associated with a statistically significant number of occurrences in the snapshots. For example, CMFA device 120 illustrated in FIG. 1 can identify patterns associated with a statistically significant number of occurrences in the snapshots. In some embodiments, the patterns can be of the entities near the user device, or a lack of the entities near the user device. Such patterns can allow user 110 to be considered trusted during a recorded time interval, or when the user device is near a particular location. In some embodiments, the patterns can be contextualized by time or by location. In some embodiments, the pattern can be considered present regardless of the presence of additional devices that are not a part of the pattern.

For example, a pattern could be the presence of a smart TV and a smart assistant, such as Google Home, Alexa, or Siri. If these devices are in a user's home, their presence could increase trust that the user is the authorized user of the device based on location. Further, if the user is usually at home in the evenings but not during the day, their presence could increase trust in the evening and their absence could increase trust during the day. If other devices, such as a friend's smartphone, are present, they may not affect the pattern of the smart TV and smart assistant. In some cases, trust could be extended only during a recorded time interval, such as a set period of time after the user speaks to the smart assistant.

Further, the method can include storing the patterns associated with the statistically significant number of occurrences in the proximity profile. For example, CMFA device 120 illustrated in FIG. 1 can store the patterns associated with the statistically significant number of occurrences in the proximity profile. The collection of devices stored in the proximity profile are considered trusted entities when they exist with other devices identified in the pattern in the proximity profile. By storing such patterns, patterns of peripheral devices can be learned and used to modulate the trust score of a user.

According to some examples, the method includes detecting entities near a user device operated by the user at block 310. For example, CMFA device 120 illustrated in FIG. 1 can detect entities near a user device operated by the user. The entities can be detected by a probing mechanism, such as an mDNS query, to reveal names, subnets, and MAC addresses of the entities.

According to some examples, the method includes calculating the trust score for the user based on a policy that incorporates data about the entities near the user device at block 315. For example, CMFA device 120 illustrated in FIG. 1 can calculate the trust score for the user. Examples of entities near the user device include, but are not limited to, routers, IP surveillance cameras, door locks, badge readers, personal wearable devices (smart watches, earphones), user operated devices, etc. The entities can be corporate-controlled devices or corporate access points that collectively reinforce that the user is on a corporate network. Data from entities near the user device can include location, information about the users of such entities, the type of entity, or other factors.

In some embodiments, the entities can also provide an accepted attestation of trustworthiness. For example, a home security system with video footage of the user using the user device can attest to the identity of the user and provide an accepted attestation of trustworthiness.

Trusted entities can be a collection of entities that are commonly simultaneously detected nearby to the user device. The trusted entities can be devices that are explicitly trusted in the policy. For example, the trusted entities can be a user smartwatch which is usually on the person of the user. Since this device is known and operated by the user, it can be explicitly trusted in the policy.

Entities can also be devices operated by an authenticated user other than the user 110 being authenticated by CMFA device 120, and can be considered trusted when the trust scores for their respective users are high; conversely, entities can be considered untrusted when the trust scores for their respective users are low. For example, co-workers of the user can operate their own devices in the vicinity of the user, and can be trusted based on their known credentials.

Entities can be trusted when they are associated with a location where they are commonly found. For example, use of a company laptop can be more trusted when it is used in the office of the user than when it is used outside the office.

Entities can be associated with data that is a proxy for an identification of a physical space associated with a location, and thereby the entities can be used to verify that a user is in a known location. For example, a smart vacuum that includes a map of the physical space, a camera viewing the physical space, a radio frequency device that can produce a map of the physical space, etc. can be used to verify a known location because these devices have been recognized in this location before, and because these devices have data regarding physical parameters of the location. Such devices can provide additional confidence that a user is in a particular location because it would be difficult for a malicious entity to spoof peripheral devices, and to spoof data indicating physical parameters of a location.

Trusted entities near the user device can result in an increased trust score, and untrusted entities near the user device can result in a decreased trust score. The trust score generation policy can also include devices, contexts, or conditions which are not trusted and result in a decreased trust score. For example, being in an unexpected location halfway around the world would be an unexpected context which could decrease trust. However, this unexpected context could be offset by other patterns, such as a normal pattern of connectivity to a user's smartwatch, smartphone, laptop, etc.

In some embodiments of calculating the trust score at block 315, the method can include determining whether the entities near the user device match at least one of the patterns stored in the proximity profile. For example, the CMFA device 120 illustrated in FIG. 1 can determine whether the entities near the user device match at least one of the patterns stored in the proximity profile.

Further, when the entities near the user device match at least one of the patterns stored in the proximity profile, the trust score can be increased. For example, the CMFA device 120 illustrated in FIG. 1 can, when the entities near the user device match at least one of the patterns stored in the proximity profile, increase the trust score.

In some embodiments of calculating the trust score at block 315, the method comprises evaluating the entities near the user device by a machine learning algorithm that classifies a context of the user device as trusted or untrusted. For example, the CMFA device 120 illustrated in FIG. 1 may evaluate the entities near the user device by a machine learning algorithm that classifies a context of the user device as trusted or untrusted. These classifications can be based on patterns learned through a record of entity snapshots.

Further, the method can include using an output of the machine learning algorithm to calculate the trust score. For example, the CMFA device 120 illustrated in FIG. 1 may use an output of the machine learning algorithm to calculate the trust score.

According to some examples, the method includes permitting access to a resource when the trust score is above a threshold at block 320. For example, the CMFA device 120 illustrated in FIG. 1 may permit access to a resource when the trust score is above a threshold.

Figure 3B:
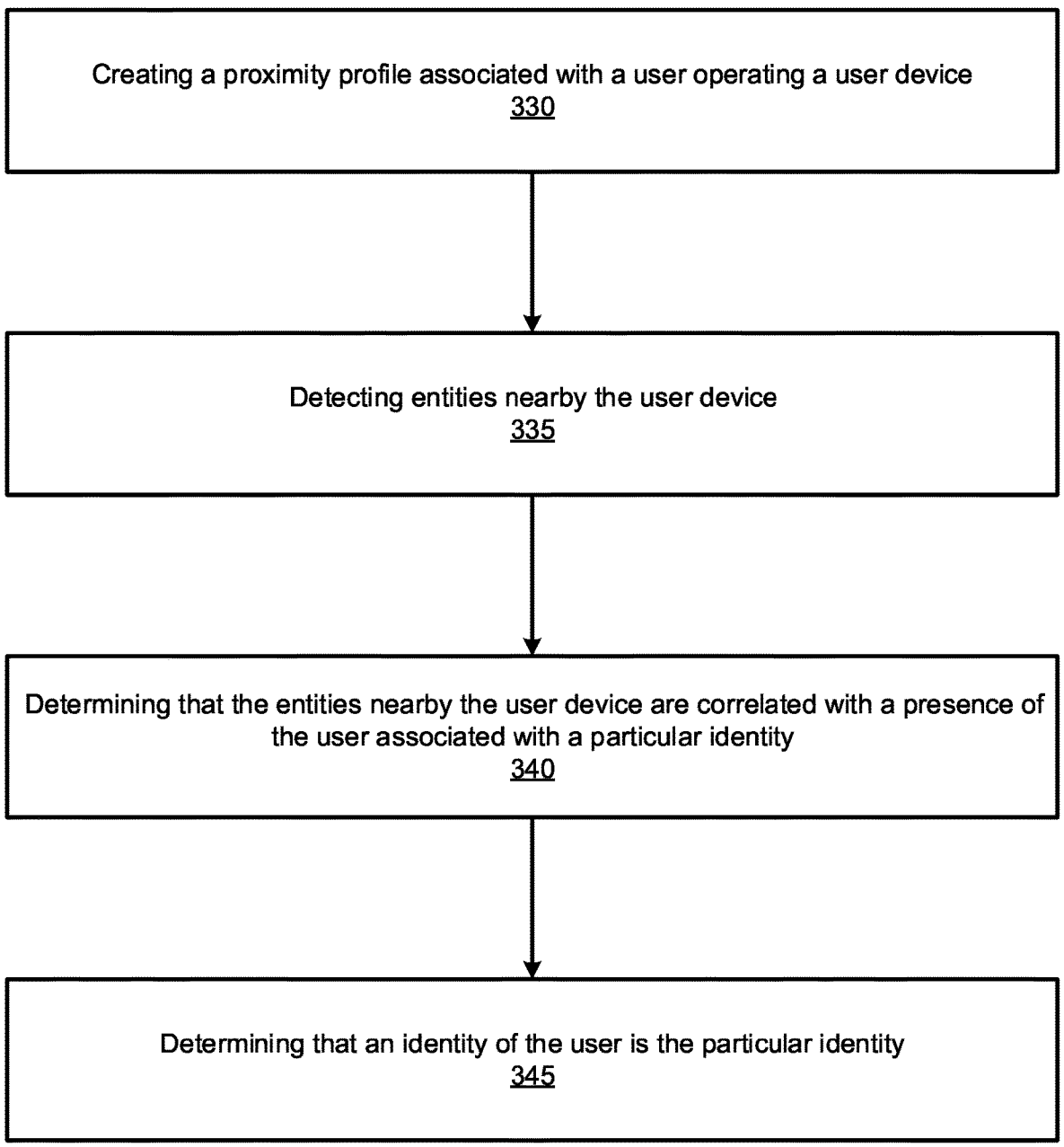

FIG. 3B illustrates an example method 325 for determining an identity of a user. Although the example method 325 depicts a particular sequence of operations, the sequence may be altered without departing from the scope of the present disclosure. For example, some of the operations depicted may be performed in parallel or in a different sequence that does not materially affect the function of the method 325. In other examples, different components of an example device or system that implements the method 325 may perform functions at substantially the same time or in a specific sequence.

According to some examples, the method includes creating a proximity profile associated with a user at block 330. For example, CMFA device 120 illustrated in FIG. 1 can create a proximity profile associated with a user.

In some embodiments of creating a proximity profile at block 330, the method includes collecting snapshots of the entities nearby the user device. For example, CMFA device 120 illustrated in FIG. 1 can collect snapshots of the entities nearby the user device. The user device may be a second device operated by the user associated with the particular identity.

Further, the method can include labeling the snapshots of the entities nearby the user device with timestamps indicating when the snapshots were collected. For example, CMFA device 120 illustrated in FIG. 1 can label the snapshots of the entities nearby the user device with timestamps indicate when the snapshots were collected.

Further, the method can include identifying patterns associated with a statistically significant number of occurrences in the snapshots of the entities nearby the user device. For example, the CMFA device 120 illustrated in FIG. 1 can identify patterns associated with a statistically significant number of occurrences in the snapshots of the entities nearby the user device.

Further, the method can include storing the patterns associated with the statistically significant number of occurrences in the proximity profile. For example, the CMFA device 120 illustrated in FIG. 1 may store the patterns associated with the statistically significant number of occurrences in the proximity profile. The patterns stored in the proximity profile can be indicative of the presence of the user associated with the particular identity.

According to some examples, the method includes detecting entities nearby the user device at block 335. For example, CMFA device 120 illustrated in FIG. 1 can detect entities nearby the user device.

According to some examples, the method includes determining that the entities nearby the user device are correlated with the presence of the user associated with a particular identity at block 340. For example, CMFA device 120 illustrated in FIG. 1 can determine that the entities nearby the user device are correlated with the presence of the user associated with a particular identity.

According to some examples, the method includes determining that the identity of the user is the particular identity, based in part on the presence of the entities nearby that are correlated with the presence of the user associated with the particular identity at block 345. For example, the CMFA device 120 illustrated in FIG. 1 can determine that an identity of the user is the particular identity, based in part on a presence of the entities nearby that are correlated with the presence of the user associated with the particular identity.

In some embodiments of determining that an identity of the user is the particular identity at block 440, the method can include evaluating the entities nearby the user device by a machine learning algorithm which classifies a presence of the entities nearby the user device as associating the user with the particular identity. For example, the CMFA device 120 illustrated in FIG. 1 can evaluate the entities nearby the user device by a machine learning algorithm that classifies the presence of the entities nearby the user device as associated with the user of the particular identity.

Figure 4:
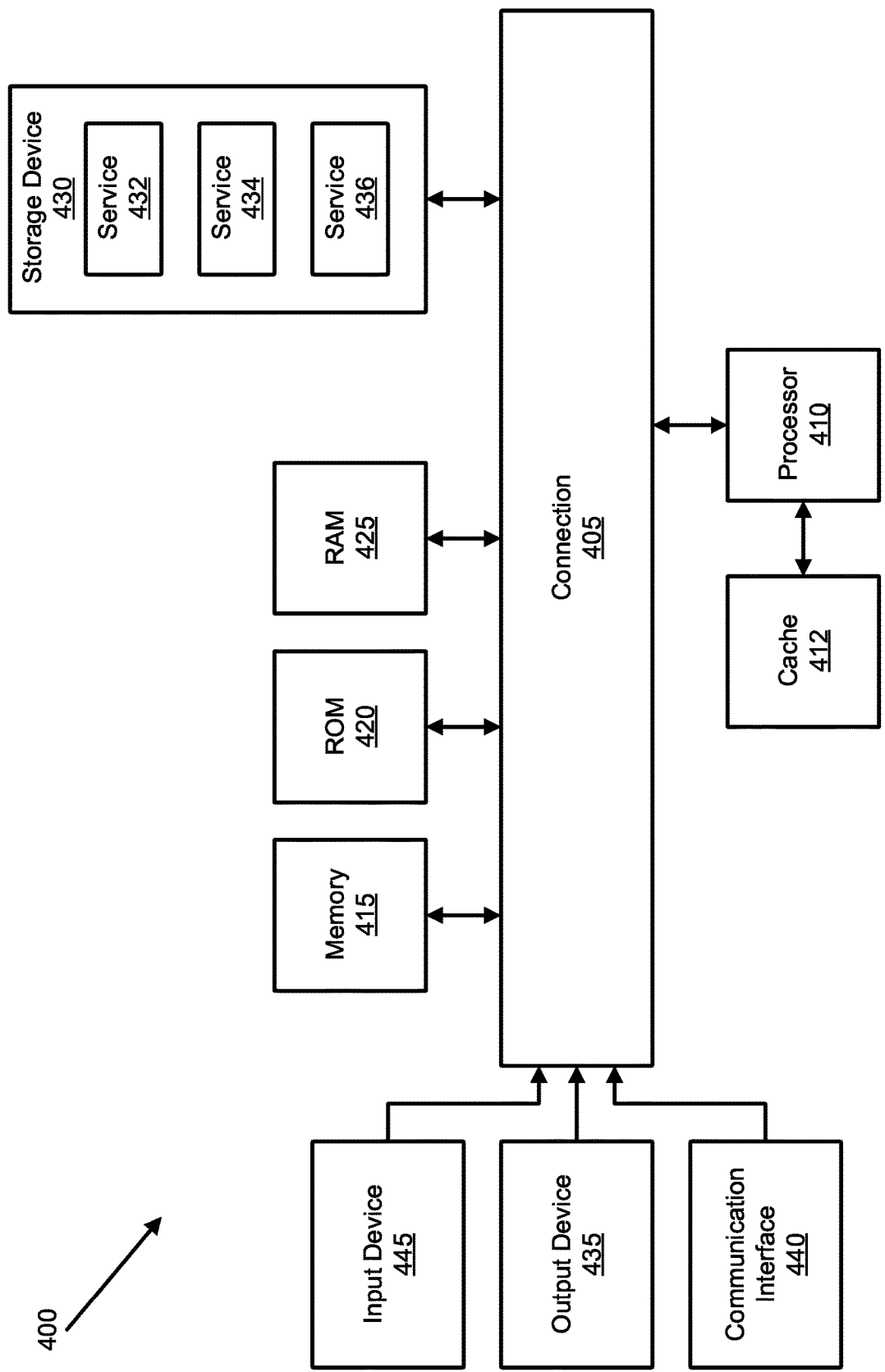
FIG. 4 shows an example of a system for implementing some aspects of the present technology.

FIG. 4 shows an example of computing system 400, which can be for example any computing device making up CMFA device 120, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1: A method for determining a trust score associated with a user comprising: detecting entities near a user device operated by the user; calculating the trust score for the user based on a policy that incorporates data about the entities near the user device, the trust score being a score that is indicative of a trust worthiness of data received from the user device, wherein trusted entities near the user device result in an increased trust score, and untrusted entities near the user device result in a decreased trust score; and permitting access to a resource when the trust score is above a threshold.

Aspect 2: The method of Aspect 1, comprising: at a time prior to detecting the entities nearby to the user device operated by the user, creating a proximity profile associated with the user, wherein creating the proximity profile comprises: collecting snapshots of the entities near the user device or of entities near another device operated by the user; labeling the snapshots with timestamps indicating when the snapshots were collected; identifying patterns associated with a statistically significant number of occurrences in the snapshots; and storing the patterns associated with the statistically significant number of occurrences in the proximity profile, where the patterns stored in the proximity profile are considered trusted entities.

Aspect 3: The method of Aspect 2, wherein calculating the trust score comprises: determining whether the entities near the user device match at least one of the patterns stored in the proximity profile; and when the entities near the user device match at least one of the patterns stored in the proximity profile, increasing the trust score.

Aspect 4: The method of any of Aspects 1 to 3, wherein calculating the trust score comprises: evaluating the entities near the user device by a machine learning algorithm which classifies a context of the user device as trusted or untrusted; and using an output of the machine learning algorithm to calculate the trust score.

Aspect 5: The method of Aspect 2, wherein the patterns are contextualized by time, and wherein at least one of the patterns is of the entities near the user device, or of a lack of the entities near the user device, and is considered trusted during a recorded time interval.

Aspect 6: The method of Aspect 2, wherein the patterns are contextualized by location, wherein at least one of the patterns is of the entities near the user device, or of a lack of the entities near the user device, and is considered trusted when the user device is near a particular location.

Aspect 7: The method of any of Aspects 1 to 6, wherein the trusted entities are a collection of the entities that are commonly simultaneously detected nearby to the user device.

Aspect 8: The method of any of Aspects 1 to 7, wherein the trusted entities are devices that are explicitly trusted in the policy.

Aspect 9: The method of Aspect 8, wherein the devices are corporate-controlled devices and are corporate access points that collectively reinforce that the user is on a corporate network, wherein examples of the devices include, but are not limited to, routers, IP surveillance cameras, door locks, badge readers, etc.

Aspect 10: The method of Aspect 8, wherein the devices are providing an accepted attestation of trustworthiness.

Aspect 11: The method of any of Aspects 1 to 10, wherein the entities are detected by a probing mechanism, such as an mDNS query, to reveal names, subnets, and MAC addresses of the entities.

Aspect 12: The method of any of Aspects 1 to 11, wherein the entities are other user-operated devices, and the entities are considered trusted when the trust scores for their respective users are high, and the entities are considered untrusted when the trust scores for their respective users are low.

Aspect 13: The method of any of Aspects 1 to 12 wherein the entities are trusted when they are associated with a location, and at least one of the entities is a device that is associated with data that is a proxy for an identification of a physical space associated with location, such as a smart vacuum that includes a map of the physical space, a camera viewing the physical space, a radio frequency device that can produce a map of the physical space, etc.

Aspect 14: The method of Aspect 2, wherein the pattern is considered to be present regardless of additional devices that are not a part of the pattern.

Aspect 15: The method of any of Aspects 1 to 14, wherein the policy can also include devices, contexts, or conditions which are not trusted and result in the decreased trust score.

Aspect 16: A method for determining an identity of a user of a user device comprising: detecting entities nearby the user device; determining that the entities nearby the user device are correlated with a presence of the user associated with a particular identity; and determining that an identity of the user is the particular identity, based in part on a presence of the entities nearby that are correlated with the presence of the user associated with the particular identity.

Aspect 17: The method of Aspect 16, comprising: at a time prior to detecting the entities nearby the user device, creating a proximity profile associated with the user, wherein creating the proximity profile comprises: collecting snapshots of the entities nearby the user device, wherein the user device may be a second device operated by the user associated with the particular identity; labeling the snapshots of the entities nearby the user device with timestamps indicating when the snapshots were collected; identifying patterns associated with a statistically significant number of occurrences in the snapshots of the entities nearby the user device; and storing the patterns associated with the statistically significant number of occurrences in the proximity profile, where the patterns stored in the proximity profile are indicative of the presence of the user associated with the particular identity.

Aspect 18: The method of Aspect 16, wherein determining that the identity of the user is the particular identity comprises: evaluating the entities nearby the user device by a machine learning algorithm which classifies a presence of the entities nearby the user device as associating the user with the particular identity.

Aspect 13: A system for determining a trust score associated with a user comprising includes a storage (implemented in circuitry) configured to store instructions and a processor. The processor configured to execute the instructions and cause the processor to: detect entities near a user device operated by the user; calculate the trust score for the user based on a policy that incorporates data about the entities near the user device, the trust score be a score that is indicative of a trust worthiness of data received from the user device, wherein trusted entities near the user device result in an increased trust score, and untrusted entities near the user device result in a decreased trust score; permit access to a resource when the trust score is above a threshold.

Aspect 14: The system of Aspect 13, wherein the processor is configured to execute the instructions and cause the processor to: at a time prior to detecting the entities nearby to the user device operated by the user, creating a proximity profile associated with the user, collect snapshots of the entities near the user device or of entities near another device operated by the user; label the snapshots with timestamps indicate when the snapshots were collected; identify patterns associated with a statistically significant number of occurrences in the snapshots; store the patterns associated with the statistically significant number of occurrences in the proximity profile, wherein the patterns stored in the proximity profile are considered trusted entities.

Aspect 15: The system of Aspect 14, wherein the processor is configured to execute the instructions and cause the processor to: determine whether the entities near the user device match at least one of the patterns stored in the proximity profile; when the entities near the user device match at least one of the patterns stored in the proximity profile, increase the trust score.

Aspect 16: The system of any of Aspects 13 to 15, wherein the processor is configured to execute the instructions and cause the processor to: evaluate the entities near the user device by a machine learning algorithm which classifies a context of the user device as trusted or untrusted; use an output of the machine learning algorithm to calculate the trust score.

Aspect 17: The system of Aspect 14, wherein the patterns are contextualized by time, and the patterns are contextualized by time, and.

Aspect 18: The system of Aspect 14, wherein the patterns are contextualized by location and the patterns are contextualized by location.

Aspect 19: The system of any of Aspects 13 to 18, wherein the trusted entities are a collection of the entities that are commonly simultaneously detected nearby to the user device.

Aspect 20: The system of any of Aspects 13 to 19, wherein the trusted entities are devices that are explicitly trusted in the policy.

Aspect 21: The system of Aspect 20, wherein the devices are corporate-controlled devices and are corporate access points that collectively reinforce that the user is on a corporate network and the devices are corporate-controlled devices and are corporate access points that collectively reinforce that the user is on a corporate network.

Aspect 22: The system of Aspect 20, wherein the devices are providing an accepted attestation of trustworthiness.

Aspect 23: The system of any of Aspects 13 to 22, wherein the entities are detected by a probing mechanism, such as an mDNS query, to reveal names, subnets, and MAC addresses of the entities.

Aspect 24: The system of any of Aspects 13 to 23, wherein the entities are other user-operated devices, and the entities are considered trusted when the trust scores for their respective users are high, and the entities are considered untrusted when the trust scores for their respective users are low.

Aspect 25: The system of any of Aspects 13 to 24, wherein the entities are trusted when they are associated with a location, and at least one of the entities is a device that is associated with data that is a proxy for an identification of a physical space associated with location, such as a smart vacuum that includes a map of the physical space, a camera viewing the physical space, a radio frequency device that can produce a map of the physical space, etc.

Aspect 26: The system of Aspect 14, wherein the pattern is considered to be present regardless of additional devices that are not a part of the pattern.

Aspect 27: The system of any of Aspects 13 to 26, wherein the policy can also include devices, contexts, or conditions which are not trusted and result in the decreased trust score.

What is claimed is:

1. A method for determining a trust score associated with a user comprising:
    detecting entities near a user device operated by the user;
    calculating the trust score for the user based on a policy that incorporates data about the entities near the user device, the trust score being a score that is indicative of a trust worthiness of data received from the user device, wherein when the entities near the user device match at least one pattern in a proximity profile associated with the user result in an increased trust score;
    permitting access to a resource when the trust score is above a threshold; and
    at a time prior to detecting the entities nearby to the user device operated by the user, creating the proximity profile associated with the user, wherein creating the proximity profile comprises:
        collecting snapshots of the entities near the user device or of entities near another device operated by the user;
        labeling the snapshots with timestamps indicating when the snapshots were collected;
        identifying patterns associated with a statistically significant number of occurrences in the snapshots; and
        storing the patterns associated with the statistically significant number of occurrences in the proximity profile, where the patterns stored in the proximity profile are considered trusted entities.

2. The method of claim 1, wherein the at least one pattern varies over time and includes presence or connection information of one or more of the entities.

3. The method of claim 1, wherein calculating the trust score comprises:
   determining whether the entities near the user device match at least one of the patterns stored in the proximity profile; and
   when the entities near the user device do not match at least one of the patterns stored in the proximity profile, decreasing the trust score.

4. The method of claim 1, wherein the patterns are contextualized by time, and wherein at least one of the patterns is of the entities near the user device, or of a lack of the entities near the user device, and is considered trusted during a recorded time interval.

5. The method of claim 1, wherein the patterns are contextualized by location, wherein at least one of the patterns is of the entities near the user device, or of a lack of the entities near the user device, and is considered trusted when the user device is near a particular location.

6. The method of claim 1, wherein calculating the trust score comprises:
   evaluating the entities near the user device by a machine learning algorithm which classifies a context of the user device as trusted or untrusted; and
   using an output of the machine learning algorithm to calculate the trust score.

7. The method of claim 1, wherein the trusted entities are a collection of the entities that are commonly simultaneously detected nearby to the user device.

8. The method of claim 1, wherein the trusted entities are devices that are explicitly trusted in the policy.

9. The method of claim 8, wherein the devices are corporate-controlled devices and are corporate access points that collectively reinforce that the user is on a corporate network.

10. The method of claim 8, wherein the devices are providing an accepted attestation of trustworthiness.

11. The method of claim 1, wherein the entities are other user-operated devices, and the entities are considered trusted when the trust scores for their respective users are high, and the entities are considered untrusted when the trust scores for their respective users are low.

12. The method of claim 1 wherein the entities are trusted when they are associated with a location, and at least one of the entities is a device that is associated with data that is a proxy for an identification of a physical space associated with location.

13. A system for determining a trust score associated with a user comprising, comprising:
   a storage configured to store instructions; and
   a processor configured to execute the instructions and cause the processor to:
      detect entities near a user device operated by the user;
      calculate the trust score for the user based on a policy that incorporates data about the entities near the user device, the trust score be a score that is indicative of a trust worthiness of data received from the user device, wherein when the entities near the user device and that match at least one pattern in a proximity profile associated with the user result in an increased trust score;
      permit access to a resource when the trust score is above a threshold; and
      at a time prior to detecting the entities nearby to the user device operated by the user, creating the proximity profile associated with the user, wherein creating the proximity profile comprises:
         collect snapshots of the entities near the user device or of entities near another device operated by the user;
         label the snapshots with timestamps indicate when the snapshots were collected;
         identify patterns associated with a statistically significant number of occurrences in the snapshots; and
         store the patterns associated with the statistically significant number of occurrences in the proximity profile, wherein the patterns stored in the proximity profile are considered trusted entities.

14. The system of claim 13, wherein the at least one pattern varies over time and includes presence or connection information of one or more of the entities.

15. The system of claim 13, wherein the processor is configured to execute the instructions and cause the processor to:
   determine whether the entities near the user device match at least one of the patterns stored in the proximity profile; and
   when the entities near the user device do not match at least one of the patterns stored in the proximity profile, decrease the trust score.

16. The system of claim 13, wherein the patterns are contextualized by time, and the patterns are contextualized by time, and.

17. The system of claim 13, wherein the patterns are contextualized by location and the patterns are contextualized by location.

18. The system of claim 13, wherein the processor is configured to execute the instructions and cause the processor to:
   evaluate the entities near the user device by a machine learning algorithm which classifies a context of the user device as trusted or untrusted; and
   use an output of the machine learning algorithm to calculate the trust score.

19. The system of claim 13, wherein the entities are trusted when they are associated with a location, and at least one of the entities is a device that is associated with data that is a proxy for an identification of a physical space associated with location.

20. Non-transitory computer-readable media containing instructions which, when executed by a processor, cause the processor to determine a trust score associated with a user, the instructions comprising:
   detecting entities near a user device operated by the user;
   calculating the trust score for the user based on a policy that incorporates data about the entities near the user device, the trust score be a score that is indicative of a trust worthiness of data received from the user device, wherein when the entities near the user device match at least one pattern in a proximity profile associated with the user result in an increased trust score; and
   permitting access to a resource when the trust score is above a threshold; and
   at a time prior to detecting the entities nearby to the user device operated by the user, creating the proximity profile associated with the user, wherein creating the proximity profile comprises:
      collect snapshots of the entities near the user device or of entities near another device operated by the user;

label the snapshots with timestamps indicate when the snapshots were collected;
identify patterns associated with a statistically significant number of occurrences in the snapshots; and
store the patterns associated with the statistically significant number of occurrences in the proximity profile, wherein the patterns stored in the proximity profile are considered trusted entities.

\* \* \* \* \*